United States Patent

[11] 3,610,352

[72] Inventor Eric Laimins
 Belmont, Mass.
[21] Appl. No. 882,048
[22] Filed Dec. 4, 1969
[45] Patented Oct. 5, 1971
[73] Assignee BLH Electronics, Inc.
 Waltham, Mass.

[54] SIDE LOAD PROTECTION DEVICE FOR TREADLE SCALES
 3 Claims, 3 Drawing Figs.
[52] U.S. Cl. .................................................... 177/134
[51] Int. Cl. .................................................... G01g 19/02
[50] Field of Search ........................................ 177/134,
 135, 210, 211

[56] References Cited
 UNITED STATES PATENTS
3,266,584 8/1966 Lee ............................... 177/134
3,474,875 10/1969 Laimins ........................ 177/134

Primary Examiner—Richard B. Wilkinson
Assistant Examiner—George H. Miller, Jr.
Attorney—Thomson, Mrose and Ericson ABSTRACT: A substantially flat, resilient plate positioned over a treadle scale with its lower surface overlying and engaging the upper load-receiving platform of the scale is secured along opposed longitudinal end surfaces of the plate to the framework in which the treadle scale is supported for transmitting loading forces in the normal loading direction only to the scale platform, while simultaneously preventing the application to the platform of adverse side loads which might damage the scale.

PATENTED OCT 5 1971

3,610,352

INVENTOR
ERIC LAIMINS

BY
Thomson, Mrosert Calesou
ATTORNEYS

SIDE LOAD PROTECTION DEVICE FOR TREADLE SCALES

BACKGROUND OF THE INVENTION present invention relates to improvements in weighing scales, especially that type of weighing scale which is mounted in substantially flush relationship with a travel surface such as a roadbed for measuring vehicle imposed loadings, and more particularly to a novel protective structure for preventing such scales from being damaged by the application thereto of adverse side loading without reducing the sensitivity of the scales in the normal loading direction.

One form of weighing scale presently in wide use for weighing vehicles is the shear-responsive type electrical weighing scale which employs electrical strain gages for translating into electrical terms the elastic strains imposed in structural elements of the scale resulting from load-induced stresses in such structural elements. In such electrical weighing scales, this strain measurement is used to provide a load indicating output which can be directly read from, or permanently recorded in, suitable electrical instrumentation.

The problems associated with platform-type vehicle weighing via electrical strain gage transducers are particularly severe, however, because the loads can be extremely large and there can be a substantial amount of attendant vibrational and shock force. At the same time, there is need for a high degree of accuracy, consistent with important determinations of truck weight relative to legal weight limits and the like. Accordingly, weighing scales capable of precise and reliable measurement of heavy vehicle loading have been designed incorporating rugged shear-responsive suspension elements which are critically located and equipped with cooperating strain gages characterizing loading forces essentially in the vertical weighing direction only, or in a direction normal to the load receiving platform.

In one form of such weighing scales, a rigid rectangular platform or treadle is suspended horizontally in substantially flush relationship with a travel surface for vehicles from a support structure disposed beneath the travel surface along each of two opposite edges of the treadle, the suspensions at each position being through a horizontally extending substantially stiff member of metal having a high modulus of elasticity. Each suspension member is shaped to exhibit optimum shear responses at vertically disposed surfaces situated between its ends, which are securely attached to the treadle and the support structure, respectively, and strain gages are mounted upon these surfaces in positions for response to the shear effects exhibited there. The suspension members are cantilevered from the support structure and have their free ends disposed beneath the platform or treadle edges, with the attachments to the support structure being aligned with the edges of the treadle, to reduce the criticality of the positioning of the load on the treadle.

Although these treadle scales are generally suitable for the purpose, they have not been found to be entirely satisfactory in all respects, primarily because they also are extremely susceptible to damage by excessive side or transverse loadings. Thus, trucks which are either heavily braked or rapidly accelerated by the operators thereof while the vehicle is bearing on the scale treadles, sometimes intentionally, will set up such excessive side or transverse forces that the scales may readily be damaged and rendered substantially useless for making further load measurements. Also, during snow removal operations, the blade of a snow plow occasionally engages the side surface of the scale through the small clearance area between such side surface and the supporting structure therefor, whereby damaging side loads are applied to the scale.

One apparent solution to this problem which at first would be thought to offer protection to treadle scales from the damaging effects of such side loadings would position side bumpers between the sidewalls or surfaces of the scale and the supporting framework to prevent lateral displacement of the scale. This approach is not suitable, however, for two reasons; namely, (1) the bumpers will be engaged by the sides of the scale during loading to set up frictional forces which will cause inaccurate load measurements to be recorded, and (2) the transverse load transmitted from the bumper to the scale will excessively strain the sensitive cell elements in their weak lateral direction and thereby permanently damage the scale.

SUMMARY OF THE INVENTION

Accordingly, it is an object of the present invention to provide a novel structure for preventing damage to treadle scales resulting from side loading.

Another object of the present invention is to provide a novel protective structure for protecting treadle scales from being damaged by the application thereto of adverse side loading without reducing the sensitivity of the scales in the normal loading direction.

A further object of the present invention is to provide a novel protective device for preventing undesirable side loading forces from being transmitted to the sensitive cells of a treadle scale, whereby such scale is not laterally deflected and thereby not damaged by such forces, and permitting deflection of a treadle scale in the vertical direction upon the application of a force or component of force thereto in the normal loading direction.

Still a further object of the present invention is to provide a novel protective structure of low-cost and rugged construction for permitting forces or components of forces in the normal loading direction only to be applied to a treadle scale.

The foregoing and other objects are attained by a protective member in the form of a substantially flat, resilient plate which is positioned over the treadle scale with its lower surface overlying and engaging the upper load-receiving platform of the scale. This resilient protection plate has a transverse dimension defined by opposed longitudinal end surfaces that overlie the platform support structure surrounding the load-receiving platform and is connected to such support structure adjacent longitudinal end surfaces thereof lying outside the periphery of the platform, whereby the protection plate may flex under loading in a direction normal to the load-receiving platform of the scale and thus transmit such forces thereto for measurement, while attenuating undesirable side loading forces that would otherwise damage the scale.

BRIEF DESCRIPTION OF THE DRAWINGS

Still other objects and many of the attendant features and advantages of the present invention will be more readily appreciated as the same becomes better understood by reference to the following detailed description when considered in connection with the accompanying drawings, wherein like reference numerals designate like or corresponding parts throughout the several views and in which.

DESCRIPTION OF AN ILLUSTRATED EMBODIMENT

Figure 1:
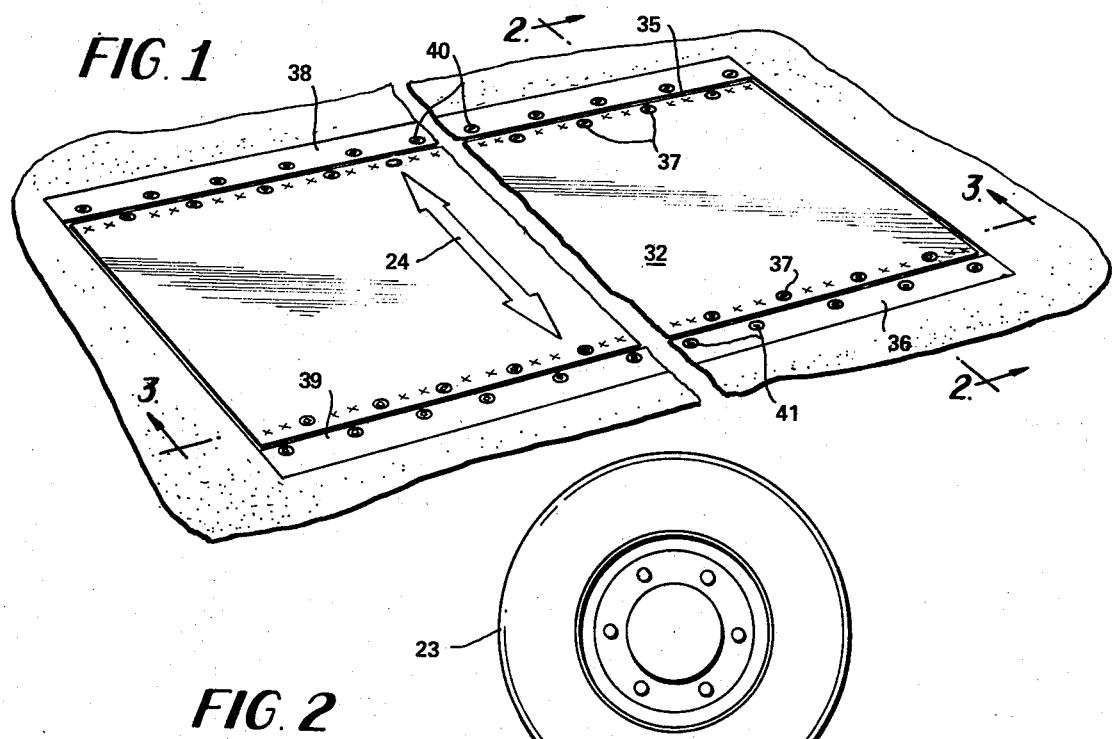
FIG. 1 portrays a novel protective structure according to the present invention for preventing damage to a treadle scale by adverse side loading forces applied thereto and having a protection plate overlying the load-receiving platform of a scale and oriented in a level relationship with the surrounding support structure of the platform and such plate.
Figure 2:
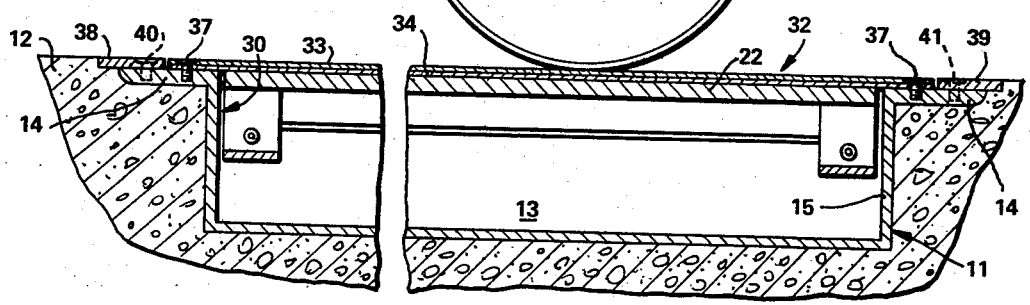
FIG. 2 is a sectional view taken substantially along the line 2—2 of FIG. 1, showing the manner in which the protection plate is supported at the level of the travel surface for vehicles which are customarily weighed by such scales.

Referring now to the drawings, a supporting framework 11 of structural steel or the like for supporting a treadle scale adapted to receive and measure very heavy loads such as may be carried by large freight trucks is shown as being disposed within a hole formed in a concrete travel surface or similar roadbed 12.

The framework 11 has a rectangular, substantially boxlike configuration forming therein a cavity 13 and is provided with exteriorly directed, perpendicularly oriented, elongate flanges 14 along the upper edges of two oppositely disposed, or parallel, sidewalls 15 and 16 thereof. Along the other two sidewalls 17 and 18 of the framework 11, similar elongate flanges 19 are disposed on the upper edges thereof and have the same structural relationship as the flanges 14 have with sidewalls 15 and 16, but the inside surface of each of these sidewalls 17 and 18 provides an elongated seat or shoulder 20 along the complete length thereof and positioned a predetermined distance below the level of the flanges 14 and 19 in a plane parallel thereto.

Figure 3:
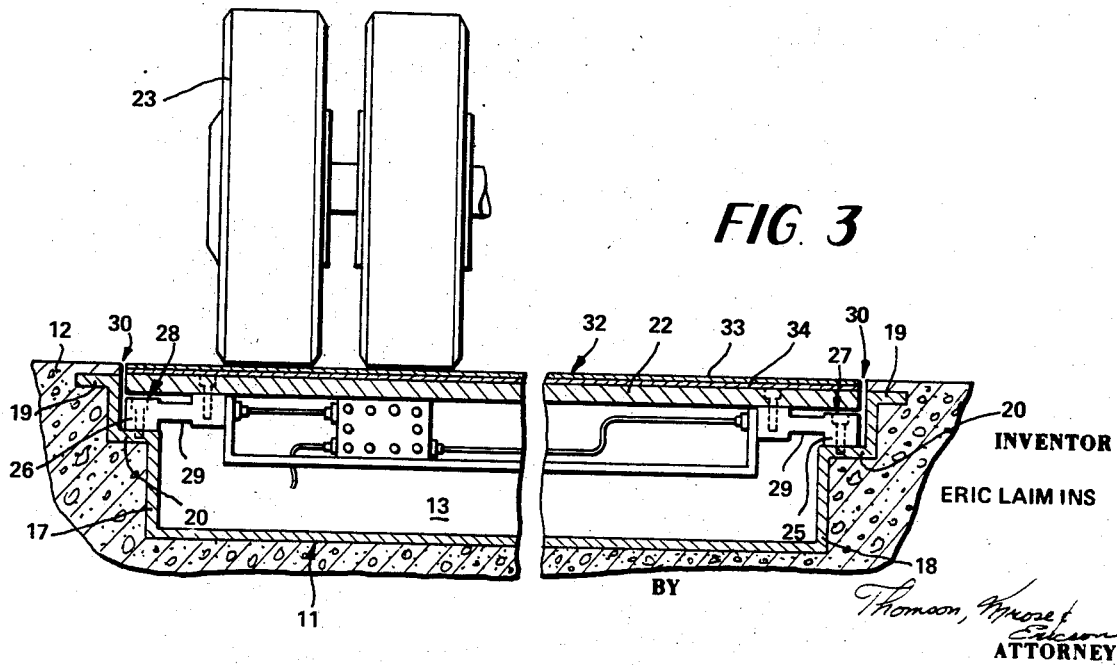
FIG. 3 is a sectional view taken substantially along the line 3—3 of FIG. 1, showing how the load-receiving platform of such treadle scales may be suspended horizontally in cantilever fashion from a support structure disposed below the travel surface and in underlying engagement with the protection plate.

A relatively broad area, rectangular shaped, load-bearing platform structure or treadle 22, which is of a construction which remains substantially stiff under the expected top loading applied by way of the tires 23 of vehicles passing thereacross in the travel directions characterized by the arrow symbol 24, is suspended in a horizontal attitude by a pair of elongate suspension members 25 and 26 independently disposed essentially along the narrower edges of the platform 22. These suspension members, which are alike and are preferably disposed below the edges of the platform 22 and do not extend appreciably beyond them, as shown in FIG. 3, are fixed securely to the platform slightly inwardly of the peripheral edges thereof along a line parallel to such edges and extend laterally outward, in cantilevered relation to the platform, to platform edge-aligned positions where they are fixed securely to the shoulders 20 on the sidewalls 17 and 18 of the supporting framework 11. The latter cantilevering is associated with measurements and, to promote such purposes, the shallow gaps 27 and 28 are left between the platform 22 and the laterally extending parts of the suspension members 25 and 26, respectively.

A plurality of shear-responsive strain gages, not shown, are disposed along a thinner and structurally weaker intermediate portion 29 of each of the suspension members 25 and 26 for sensing the strain induced therein by loading of the platform 22, and they are electrically connected into appropriate bridge circuits of well-known form which will yield electrical outputs characteristic essentially of the vertical loading forces only.

When properly positioned and structurally assembled according to the teachings of the present invention, the upper surface of the platform 22 and the upper surfaces of the flanges 14 and 19 of the framework 11 are substantially coplanar horizontally and are separated by only a very narrow gap 30 peripherally about the platform. Also, these upper surfaces are disposed below the ground level a predetermined minimal distance for accommodating a protective structure 32.

The side load protection member 32 comprises a pair of substantially flat, resilient metal plates 33 and 34 of the same rectangular configuration mounted back-to-back in superposed relation and having a transverse dimension defined by opposed, parallel longitudinal end surfaces 35 and 36, which overlie the scale framework 11 and along which the plates are secured thereto by parallel rows of bolts 37 extending through aligned openings in the plates and the horizontal flanges 14 of the framework. If desired, the metal plates can be spot welded to he framework 11 in the region between the bolts 37. An approach plate 38 and an exit plate 39 are bolted to the horizontal flanges 14 of the framework 11 by rows of bolts 40 and 41, respectively, which rows parallel the rows of bolts 37, as shown in FIG. 1. When secured together in this manner, the upper surfaces of the approach plate 38, the exit plate 39 and the upper metal plate 33 of the protection structure 32 are designed to lie in substantially the same plane as the upper surface of the surrounding roadway or travel surface 12.

Although a single plate of a predetermined thickness may be used as a protective structure 32, it is recognized that the stiffness of such a plate, or its resistance to bending, varies directly as the cube of its thickness. Accordingly, the protective structure 32 of the present invention preferably employs two thinner plates, such as plates 33 and 34 illustrated herein, which when superposed upon each other offer the same predetermined thickness, but have a much reduced stiffness than would a single plate of the same total thickness, whereby the plates 33 and 34 are more free to flex in a direction normal to the load-receiving platform 22 of the scale, as in the manner of a diaphragm. This greater sensitivity in the normal loading direction permits a more accurate measurement to be made of the vehicular weight imposed thereon. Also, since the plates are not free to flex in a transverse direction, side loading forces are not transmitted to the load-receiving platform 22, and excessive side loads which normally would damage the scale are therefore alleviated.

In practice, metal plates having a thickness of approximately one-sixteenth of an inch have been found to be suitable for the purpose, where the transverse dimension of the plates is on the order of about 21 inches. For purposes of this disclosure, the transverse dimension of the protection structure 32 is not necessarily the short dimension thereof, as shown, but is considered to be the dimension of the structure in the direction of vehicular travel, as indicated by the arrow 24.

Obviously, many modifications and variations of the present invention are possible in light of the above teachings. It is therefore to be understood that within the scope of the appended claims, the invention may be practiced otherwise than as specifically described.

What is claimed is:

1. In combination, a treadle scale mounted within a framework, said scale having a substantially flat and rectangular upper load-receiving platform; a protection structure for preventing said scale from being damaged by side loading comprising at least one substantially flat and rectangular resilient plate having a lower surface overlying and engaging said flat upper load-receiving platform of said scale and an upper surface adapted to receive load applied thereto by tires of vehicles passing thereacross in a travel direction, said structure having opposed longitudinal edges substantially transverse to said travel direction and overlying said framework; and means securing said edges of said structure to said framework, the other edges of said structure being substantially coextensive with said platform and being spaced from said framework to promote deflection of said other edges with said platform.

2. The combination of claim 1, wherein said protective structure comprises at least two substantially flat resilient plates mounted one upon the other in substantially coextensive relationship, said plates being of substantially the same thickness, the lower surface of the bottom plate overlying and engaging said upper load-receiving platform and the upper surface of the top plate receiving said load applied thereto by tires of vehicles, and wherein said means securing said edges secures said edges of said plates to said framework.

3. The combination of claim 1, wherein said means securing said edges comprises means fastening each of said edges of said structure to said framework at points lying outside the peripheral limits of said load-receiving platform underlying said structure, and wherein said structure has a thickness substantially between one-sixteenth inch and one-eighth inch.